Patented Nov. 6, 1951

2,574,355

UNITED STATES PATENT OFFICE 2,574,355

HYDROGENATION PROCESS

Warren M. Smith, Baton Rouge, La., assignor to Standard Oil Development Company, a corporation of Delaware No Drawing. Application August 13, 1948,
Serial No. 44,219

3 Claims. (Cl. 260—450)

The present invention relates to improvements in the manufacture of hydrocarbons including normally gaseous hydrocarbons from a feed gas containing hydrogen and the oxides of carbon. In particular, the present improvements relate to reducing the oxygen compounds or the oxygen content of the raw synthesis product formed during the reduction of the oxides of carbon with hydrogen in the presence of a suitable catalyst.

The synthesis of hydrocarbons including oxygenated hydrocarbons, from a feed gas containing hydrogen and carbon monoxide is a matter of record. The early work done in this particular field was carried out in the presence of a promoted and supported cobalt catalyst. Subsequently, however, the possibilities of using an iron catalyst were investigated from the standpoint of producing high octane gasoline. The latter type of catalyst is now deemed to be the better for producing high quality gasoline directly from the synthesis reactor.

In producing hydrocarbons including normally liquid hydrocarbons from a feed gas containing carbon monoxide and hydrogen by contacting said gases with an iron catalyst, usually promoted with a material such as potassium chloride or carbonate, a temperature of about 650° to 775° F. and a pressure of about 250 to 800 p. s. i. absolute are maintained in the reaction zone. The catalyst may be in the form of a fixed bed. That is to say, the catalyst in the form of pills, pellets or shaped bodies may be disposed as a unitary mass in the reaction zone, or the catalysts may be carried in a plurality of perforated trays in the said reaction zone.

On the other hand, more recent developments in this particular art have been in the use of a fluidized catalyst, wherein, as is known, catalyst in the form of a dense, turbulent, fluidized mass of powdered catalyst in gasiform material is contacted with the feed gas at the proper conditions of temperature and pressure to effect the desired conversions.

As previously indicated, however, the product may contain appreciable quantities of oxygenated hydrocarbons, particularly when using an iron catalyst. Oxygenated hydrocarbons are undesirable in an aviation or motor fuel and also in the heavier kerosene, diesel fuel and gas oil fractions. The invention relates to a process for "de-oxygenating" the oxygenated hydrocarbons associated with the normally liquid hydrocarbons.

As explained, in the ordinary hydrocarbon synthesis process using carbon monoxide and hydrogen as the feed gas to the reaction zone, oxygenated compounds are formed which are associated with or dissolved in the water layer of the product and other oxygenated hydrocarbons are associated with the oil layer. Explaining this more fully, the reaction between carbon monoxide and hydrogen in the hydrocarbon synthesis process results in the formation of water which, of course, passes out of the reactor with the hydrocarbons and oxygenated hydrocarbons. After cooling, the product is usually conducted to a quiescent zone where it is permitted to stratify to form a lower aqueous layer and an upper oil layer. Oxygenated hydrocarbons appear in both layers. Therefore after separation of the layers, the oil layer will contain oxygenated hydrocarbons and it is this oil layer which is treated according to the present invention to de-oxygenate the oxygenated hydrocarbons.

The main object of the present invention is to improve the quality of synthetic oil containing oxygenated hydrocarbons in a manner which is cheaper and more efficient than those heretofore used.

Other and further objects of the invention will appear from the following more detailed description and claims.

A plurality of tests were made in which the process of the present invention was compared with processes employed in the prior art, or processes suggested therein. It has been found that cobalt molybdate catalyst carried on active alumina gave improved results in removing oxygen from oxygenated hydrocarbons when used in the presence of hydrogen at elevated temperatures and pressures in that the oxygenated hydrocarbon could be de-oxygenated without, however, saturating the previously existing olefinic hydrocarbons. This is very important in the manufacture of a high octane gasoline. As previously pointed out from the standpoint of producing good quality gasoline, the hydrocarbon synthesis process employing the iron catalyst gave better results. This is undoubtedly due to the fact that gasoline fraction of such synthetic oil contains appreciable quantities of olefins and perhaps some aromatics. Any aftertreatment, therefore, designed to improve the quality of the gasoline must have strict regard to the fact that neither the olefins nor the aromatic hydrocarbons should be hydrogenated, for, to the extent to which they are hydrogenated, the gasoline is depreciated in anti-knock quality.

This feature of oxygen removal in the presence of hydrogen without saturation of existing olefinic hydrocarbons is also of importance in the treating of olefinic synthetic oil fractions which are to be used in the production of synthetic lubricating oils by polymerization of the olefins over a catalyst such as aluminum chloride In this case maintenance of the olefinic structure is imperative to the operation of the polymerization process while removal of oxygenated hydrocarbons is necessary in order to reduce the consumption of the polymerization catalyst since oxygenated compounds unite mol for mol with the catalyst to form relatively non-catalytic double compounds whereas purely olefinic compounds may be successfully polymerized with a much lower catalyst consumption.

There are set forth below the conditions and the results of four tests which were made on a synthetic gas oil in order to determine the effectiveness of said catalyst or contact agents in promoting the de-oxygenation of said gas oil without at the same time saturating any olefins present in the said gas oil. Tests referred to are numbered I, II, III, and IV. The catalysts employed in runs I, II and III are standard hydrogenation catalysts. The catalyst used in accordance with this invention in run IV was prepared as follows: 1132 grams of ammonium molybdate were ground to a powder, placed in 1100 cc. of distilled water, heated to 170° F. and 700 cc. of concentrated ammonium hydroxide was added while stirring until the ammonium molybdate was dissolved. The solution was removed from the hot plate and 915 grams of cobalt nitrate hexahydrate in 1000 cc. of water was added: 5,421 grams of activated alumin were impregnated with the foregoing solution, then dried at 240° F., heated at about 700° F. for several hours to decompose the resulting ammonium nitrate and finally the catalyst was activated by heating at around 1200° F. for about 6 hours. The catalyst was made up to contain approximately the following:

| | Weight percent |
|---|---|
| Cobalt oxide | 3.6 |
| Molybdenum trioxide | 12.8 |
| Alumina | 83.6 |

The catalyst is considered to be a mixture of cobalt molybdate ($CoMoO_4$) and molybdenum oxide ($MoO_3$) supported on activated alumina.

"O" with the product after treatment with the cobalt catalyst it is seen that there is a decrease in acid number, which is indicative of a decrease in oxygen content. Increased aniline number also indicates reduction in the amount of oxygenated derivatives. Increased aniline number also means increased paraffin content, but in the present instance increased bromine number suggests that the olefin content is increased rather than decreased. Thus, incresed aniline number means decrease in oxygen content. The reduction in the percent of oxygen from 6.4% in the feed to 0.1% in the product is noteworthy. Even though the precision of 0.1% may be questioned and it may be that the figure is actually 0.2 or 0.3, it is clear that there is a marked decrease in oxygen content.

It is quite apparent from the foregoing data that the cobalt molybdate catalysts are much superior to the two nickel catalysts for the removal of oxygen compounds from hydrocarbon synthesis product.

Similar removal of oxygen compounds from hydrocarbon synthesis product without concomitant hydrogenation of olefinic hydrocarbons may also be carried out at elevated temperatures in the absence of added hydrogen using as a catalyst the cobalt molybdate on activated alumina, or indeed, even activated alumina alone. However, in these instances, carbon formation on the catalyst is excessive, which leads to much more rapid decline in catalyst activity and much more frequent catalyst regeneration than is required by the use of cobalt molybdate on alumina in a hydrogen atmosphere.

The process for improving the quality of the synthetic oil, either the gasoline or the gas oil, may be performed in any suitable apparatus. A convenient way to accomplish the invention would be to pass the hydrocarbon oil vapors containing the oxygenated compounds together with hydrogen, downwardly through a fixed bed of the catalytic material carried on some sort of a foraminous support. Of course, the catalyst in powdered form might also be suspended to form a fluidized mass in the vapors undergoing treatment. It will be understood, of course, that the improvements are applicable to de-oxygenating

| Catalyst | | 55% Ni on Kieselguhr | 10% NiO on Alumina | | CoMoO$_4$+ MoO$_3$ on Alumina |
|---|---|---|---|---|---|
| | O | I | II | III | IV |
| Catalyst Temp., ° F | | 575 | 575 | 700 | 700 |
| Reactor Pressure, p. s. i. g | | 100 | 100 | 100 | 100 |
| Feed Rate, v./v./hr.[1] | | 1.0 | 1.0 | 0.5 | 0.5 |
| Reactor Outlet Gas, Rate CF/B [2] | | 5,100 | 5,800 | 3,600 | 6,500 |
| | Feed Stock— Synthetic Gas Oil | | | | |
| Gravity, ° A. P. I | 37.6 | 43.6 | 38.0 | 40.2 | 44.8 |
| Per Cent at 250° F | 4 | 20 | 4 | 10 | 20 |
| Aniline Point, ° F | 50 | 120 | 57 | 73 | 117 |
| Bromine No | 52 | 8 | 46 | 52 | 60 |
| Specific Disp | 112 | 104 | 110 | 115 | 118 |
| Acid Number | [3] 102 | 17 | 40 | 31 | 6 |
| Oxygen | 6.4 | | | | 0.1 |
| Color (R) | 2 | 1¼ | 2¾ | 5½ | 12½ |

[1] v./v./hr.=Volumes of liquid oil fed per volume of catalyst per hour.
[2] CF/B=Cubic feet of gas (50-100% Hydrogen) per barrel of oil feed.
[3] Equivalent to 5.8% oxygen.

The above data illustrate the effectiveness of the cobalt molybdate catalyst for oxygen removal from synthetic gas oils. In the comparison of the original feed given under the column headed any normally liquid hydrocarbon material containing oxygenated hydrocarbons.

To review briefly, it has been discovered that cobalt molybdate which may or may not contain additional free molybdenum oxide or cobalt oxide carried on activated alumina is a good catalyst for de-oxygenation of gas oils under hydrogenation conditions without hydrogenation of olefins present in these oils. By activated alumina, it is meant a highly porous form of alumina which may be produced by subjecting purified alumina hydrate to rather high temperatures of the order of 1000° F. or so. This material is, of course, available commercially.

In the foregoing examples there has been disclosed the use of a catalyst containing cobalt oxide and molybdenum oxide in proportions such that it contains 3 weight percent cobalt for each 9 weight percent molybdenum, respectively, calculated as the metal. Such a composition corresponds to the compound cobalt molybdate plus excess molybdenum oxide. It is to be understood that various proportions of cobalt oxide and molybdenum oxide may be used.

One method of incorporating these materials into the alumina is by immersing alumina in, say, an aqueous ammoniacal solution of a cobalt salt and a molybdenum salt and then drying the impregnated alumina. The thus impregnated alumina may then be heated to about 700° F. to decompose the said salts and then heated for several hours at elevated temperatures, say 1200° F. to activate the same.

In general, it may be stated that a sixth group metal oxide such as chromium oxide, molybdenum oxide or tungsten oxide in connection with an eighth group metal oxide such as cobalt oxide or nickel oxide to form a nickel or cobalt salt with or without excess molybdenum or chromium oxide may be used as a catalyst.

Numerous modifications of the invention will be apparent to those who are skilled in this art without departing from the spirit thereof.

What is claimed is:

1. The method of reducing the oxygenated compounds contained in a hydrocarbon synthesis product formed by the reduction of an oxide of carbon with hydrogen, without substantial hydrogenation of olefins and aromatics contained therein, which comprises treating said product with hydrogen at elevated temperatures and pressures in the presence of a catalyst consisting essentially of one of the class consisting of cobalt and nickel chemically combined with a sixth group metal oxide on active alumina.

2. The method of claim 1 in which the catalyst comprises cobalt molybdate on active alumina.

3. The method set forth in claim 1 in which the catalyst comprises a mixture of cobalt molybdate and molybdenum trioxide.

WARREN M. SMITH.

REFERENCES CITED

The following references are of record in the file of this patent:

UNITED STATES PATENTS

| Number | Name | Date |
| --- | --- | --- |
| 2,059,495 | Smeykal | Nov. 3, 1936 |
| 2,205,184 | Woodhouse | June 18, 1940 |
| 2,393,288 | Byrns | Jan. 22, 1946 |
| 2,437,532 | Huffman | Mar. 9, 1948 |
| 2,452,121 | Grahame | Oct. 26, 1948 |

FOREIGN PATENTS

| Number | Country | Date |
| --- | --- | --- |
| 111,374 | Australia | Aug. 23, 1940 |
| 860,383 | France | Sept. 30, 1940 |